United States Patent
Sugimoto

[11] Patent Number: 5,986,601
[45] Date of Patent: Nov. 16, 1999

[54] OBJECT DETECTING SYSTEM FOR VEHICLE

[75] Inventor: Yoichi Sugimoto, Wako, Japan

[73] Assignee: Honda Giken Kogyo Kabushiki Kaisha, Tokyo, Japan

[21] Appl. No.: 09/098,304

[22] Filed: Jun. 18, 1998

[30]     Foreign Application Priority Data

Jun. 25, 1997   [JP]   Japan ................................. 9-168519

[51] Int. Cl.⁶ ................................................. G01S 13/93
[52] U.S. Cl. ........................... 342/70; 342/109; 342/115
[58] Field of Search ............................... 342/70, 71, 72, 342/107, 109, 115; 701/300, 301

[56]            References Cited

U.S. PATENT DOCUMENTS

| | | | |
|---|---|---|---|
| 4,110,754 | 8/1978 | Endo | 342/147 |
| 4,308,536 | 12/1981 | Sims, Jr. et al. | 342/70 |
| 5,291,207 | 3/1994 | Kikuchi et al. | 342/70 |
| 5,321,407 | 6/1994 | Kikuchi et al. | 342/70 |
| 5,689,264 | 11/1997 | Ishikawa et al. | 342/70 |
| 5,832,407 | 11/1998 | Kai et al. | 342/71 X |

FOREIGN PATENT DOCUMENTS

6-160510   6/1994   Japan .
8-240660   9/1996   Japan .

*Primary Examiner*—John B. Sotomayor
*Attorney, Agent, or Firm*—Nikaido, Marmelstein, Murray & Oram LLP

[57]            ABSTRACT

In an object detecting system for a vehicle to detect an object in accordance with the result of a search operation of the radar, and to allow detection of a deviation of the radar search direction irrespective of the vehicle traveling condition. The stationary object decision unit detects whether or not an object recognized by the object recognition unit as a result of the search operation of the radar is a stationary object. The moving locus of the object, which was determined to be stationary, relative to the vehicle is predicted by the locus prediction unit based on the detected value produced by the motion state detection unit. The actual moving locus of the object, determined as a stationary object, as observed from the vehicle is calculated by the actual locus calculation unit. The predicted value produced by the locus prediction unit and the calculated value produced by the actual locus calculation unit are compared by the comparison device. Based on the result of this comparison, the improper state decision unit decides whether the radar is in an improper state or not.

14 Claims, 4 Drawing Sheets

OBJECT DETECTING SYSTEM FOR VEHICLE

BACKGROUND OF THE INVENTION

1. Field of the Invention

The present invention relates to an object detecting system for a vehicle having a radar which includes an electromagnetic wave transmission means for transmitting an electromagnetic wave in a direction in which the vehicle is traveling and a reflected wave reception means for receiving an electromagnetic wave that is generated by objects in the direction of traveling of the vehicle reflecting the wave transmitted from the electromagnetic wave transmission means, whereby the system detects the objects based on the detection result of the radar.

2. Description of the Prior Art

A system has been known, as disclosed for example in Japanese Patent Application Laid-Open Nos. 8-240660 and 6-160510, which has a radar to transmit an electromagnetic wave such as a laser in a direction in which a vehicle is traveling and to receive an electromagnetic wave reflected from an object present in front of the vehicle, whereby the system detects the object in front of the vehicle based on the result of the search operation of the radar and, in accordance with the result of detection, issues an alarm to urge a driver to avoid the object by manual operation or automatically performs an object avoidance operation.

Such an object detecting system must detect only those objects present on the path in which the vehicle is traveling as path objects and avoid detecting or recognizing objects outside the path of travel. For this purpose, the conventional systems aim at improving the ability to detect path objects by setting the radar to have a plurality of horizontally differing detection directions or to scan in a horizontal direction and by estimating the direction of travel of the vehicle from the steering angle, yaw rate, and the like thereby to determine only those objects in the vehicle path as the path objects. Another means of improving the path object detection capability involves setting the radar to have a plurality of vertically differing detection directions or to scan in the vertical direction.

Although the detection direction of the radar is precisely adjusted before shipping, the detection direction may become misadjusted or deviated by light collision or other causes. When such a misadjustment or deviation is large, it becomes difficult to precisely locate the position of a path object, making it likely that the motion control of the vehicle with respect to the path object, will be inaccurate. It is therefore desirable that when the detection direction of the radar deviates, the misadjustment or deviation of the detection direction be automatically corrected or that the driver be informed and urged to make repairs.

To solve this problem, the object detection system disclosed in Japanese Patent Application Laid-Open No. 6-160510 detects the presence of a deviation in the radar detection direction based on a deviation of an observed locus of specific static objects, such as roadside reflectors, as observed from the vehicle with respect to a reference locus when traveling straight with a zero steering angle. This conventional system, however, can only detect the deviation in the detection direction under a limited condition, i.e., when the vehicle is traveling straight.

SUMMARY OF THE INVENTION

The present invention has been achieved under these circumstances and its objective is to provide an object detecting system for a vehicle that can determine the presence of a deviation in the radar detection direction regardless of the traveling condition of the vehicle.

To achieve the above objective, a first feature of the present invention comprises a radar for performing a search operation, the radar including an electromagnetic wave transmission means to transmit an electromagnetic wave in the traveling direction of the vehicle and a reflected wave reception means to receive a reflected wave produced when the electromagnetic wave transmitted from the electromagnetic wave transmission means is reflected by an object present in the traveling direction of the vehicle, whereby the object detecting system detects the object based on the result of the radar search operation, the object detecting system comprising; a motion state detection means to detect a motion state of the vehicle including a vehicle speed; an object recognition means to recognize the object present in the traveling direction of the vehicle in terms of at least a position thereof relative to the vehicle in accordance with the result of the radar search operation; a stationary object decision means to decide, based on the result of detection by the motion state detection means, whether or not the object recognized by the object recognition means is a stationary object; a locus prediction means to estimate a moving locus of the object relative to the vehicle in accordance with the result of detection by the motion state detection means, the object being determined as a stationary object by the stationary object decision means; an actual locus calculation means to calculate an actual moving locus of the object relative to the vehicle in accordance with a change over time of the relative position of the object recognized by the object recognition means, the object being determined as a stationary object by the stationary object decision means; a comparison means for comparing the estimated value produced by the locus prediction means and the calculated value produced by the actual locus calculation means; and an improper state decision means to determine an improper state of the radar based on the result of the comparison produced by the comparison means.

With the above configuration, it is possible under ordinary traveling conditions not limited to specified traveling conditions to detect when the radar is in an improper state in which the laser emission direction is deviated. Roadside stationary objects, such as guardrails, traffic light poles and utility poles, are frequently observed during ordinary cruising. The moving locus of the object, determined to be stationary by the stationary object decision means, as observed from the vehicle is predicted by the locus prediction means in accordance with the result of detection by the motion state detection means that detects the motion state of the vehicle. The comparison means compares the predicted moving locus with the observed value of the moving locus, which was calculated by the actual locus calculation means based on the change over time of the relative position of the object recognized by the object recognition means that recognizes the object in terms of its position relative to the vehicle based on the result of the search operation of the radar. These operations determine the directional deviation of laser emission from the radar and, in accordance with that deviation, allows easy detection of an improper state of the radar in which the laser emission direction is deviated.

In addition to the above configuration, the motion state detection means includes a vehicle speed detection section to detect the speed of the vehicle and a lateral motion detection section to detect a yaw rate or lateral acceleration of the vehicle, and wherein the locus prediction means estimates the moving locus of the object relative to the vehicle based on the vehicle speed detected by the vehicle speed detection section and on the yaw rate or lateral acceleration detected by the lateral motion detection section. This allows estimation of the moving locus of the object in a plane substantially parallel to the travel road surface by the locus prediction means of simple configuration.

In addition, the actual locus calculation means calculates the moving locus of the object relative to the vehicle in a plane substantially parallel to a road surface on which the vehicle is traveling, the object being determined as a stationary object, and wherein the improper state decision means outputs a signal representing the improper state when a signal output from the comparison means in accordance with the result of the comparison between the calculated result from the actual locus calculation means and the estimated result from the locus prediction means, is greater than a first threshold value. The signal output from the comparison means corresponds to a deviation in the plane substantially parallel to the travel road surface. This makes it possible to easily determine when the deviation of the radar search direction from the proper direction, in a plane substantially parallel to the travel road surface becomes large.

In addition to the above configuration, the invention further includes an object relating means which relates a path object, for which the vehicle motion must be controlled, to at least one of a relative position and a relative speed of the object with respect to the vehicle in accordance with the result of the recognition by the object recognition means and the result of detection by the motion state detection means. The comparison means comprises a calculation section to calculate a difference between the estimated value determined by the locus prediction means and the calculated value determined by the actual locus calculation means, and a correction section to correct, based on the calculation by the calculation section, at least one of the relative position and the relative speed to which the object relating means relates the path object. With this configuration, it is possible to correct at least one of the relative position and the relative speed of the path object, for which the vehicle motion must be controlled, in accordance with the deviation of the radar search direction from the proper direction in a plane virtually parallel to the travel road surface, thereby controlling the vehicle motion with improved precision.

In making corrections with the correction section, it is preferred that the current calculation result and the past calculation result produced by the calculation section are used to make corrections.

In addition to the configuration, when the stationary object decision means decides that two or more of the objects detected simultaneously by the radar are stationary, the correction section increases the degree of the correction that is based on the object having a small lateral deviation with respect to the traveling direction of the vehicle. In using the result of detection by the motion state detection means to estimate the moving locus of the object, the degree of correction is increased when the detection error of the motion state detection means is relatively small, i.e., when the vehicle's lateral motion is small and the object is close to the front of the vehicle. With this correction process, it is possible to correct with high precision the deviation of the radar search direction in a plane virtually parallel to the travel road surface.

In addition to the above configuration a straight traveling state decision means determines, based on the result of detection by the motion state detection means, whether the vehicle is traveling straight; wherein the correction section makes a larger degree of correction when the straight traveling state decision means decides that the vehicle is traveling straight than when the vehicle is not traveling straight. Because the detection error of the motion state detection means is relatively small when the vehicle is traveling straight, it is possible to correct with high precision the deviation of radar search direction in a plane virtually parallel to the travel road surface.

The correction section increases the degree of correction as the calculated locus amount determined by the actual locus calculation means increases. This allows accurate correction of the deviation of the radar search direction by taking advantage of the fact that the larger locus amount results in an improved locus amount calculation precision regardless of the precision of the object recognition means in locating the relative position, with respect to the vehicle, of the object present in the traveling direction of the vehicle.

The motion state detection means includes a vehicle speed detection section for detecting the speed of the vehicle and a vertical motion detection section for detecting a pitch rate or vertical acceleration of the vehicle, and the locus prediction means estimates the moving locus of the object relative to the vehicle in accordance with the vehicle speed detected by the vehicle speed detection section and the pitch rate or vertical acceleration detected by the vertical motion detection section, the object being determined as a stationary object. This allows the estimation of the moving locus of the object in a plane substantially perpendicular to the travel travel road surface with the locus prediction means of simple configuration.

In addition to the above configuration the actual locus calculation means calculates the moving locus of the object relative to the vehicle, in a plane substantially perpendicular to a road surface on which the vehicle is traveling, the object being determined as a stationary object, and the improper state decision means outputs a signal representing the improper state when a signal, output from the comparison means in accordance with the result of the comparison between the calculated result from the actual locus calculation means and the estimated result from the locus prediction means, is greater than a second threshold value, the signal output from the comparison means corresponding to a deviation in a plane substantially perpendicular to the travel road surface. This makes it possible to easily determine when the deviation of the radar search direction from the proper direction in a plane virtually perpendicular to the travel road surface becomes large.

Further, an object relating means relates the path object, for which the vehicle motion must be controlled, to at least one of a relative position and a relative speed of the object with respect to the vehicle in accordance with the result of the recognition by the object recognition means and the result of detection by the motion state detection means. The comparison means comprises a calculation section to calculate a difference between the estimated value determined by the locus prediction means and the calculated value determined by the actual locus calculation means, and a correction section to correct, based on the result of the calculation by the calculation section, at least one of the relative position and the relative speed to which the object relating means relates the path object. With this configuration, at least one of the relative distance and the relative speed of the path object, for which the vehicle motion must be controlled, can be corrected in accordance with the deviation of the radar search direction in a plane virtually perpendicular to the travel road surface, thereby controlling the vehicle motion more precisely.

A road surface gradient decision means decides the gradient variation of the road surface on which the vehicle is traveling, wherein the correction section sets a larger coefficient for correcting the deviation of the radar search direction when the road surface gradient decision means decides that a gradient variation is infrequent. By taking advantage of the fact that the detection error of the motion state detection means is smaller when the gradient variation of the travel road surface is infrequent rather than when the gradient variation is frequent, it is possible to increase the degree of correction, thereby correcting with improved precision, the deviation of the radar search direction in a plane virtually perpendicular to the travel road surface.

The correction section increases the degree of correction as the calculated locus amount determined by the actual locus calculation means increases. This allows more precise correction of the deviation of the radar search direction, by taking advantage of the fact the greater locus amount will improve the locus amount calculation precision regardless of the precision of the object recognition means in locating the relative position, with respect to the vehicle, of the object present in the traveling direction of the vehicle.

Further, an informing means informs that the determination by the improper state decision means indicates an improper state of the radar. With this configuration, when the radar is in an improper state, the informing means can be activated to urge the driver to repair the radar.

BRIEF DESCRIPTION OF THE DRAWINGS

The mode for carrying out the invention will be explained by referring to the embodiments of the invention shown in the accompanying drawings.

DETAILED DESCRIPTION OF THE PREFERRED EMBODIMENTS

Figure 1:
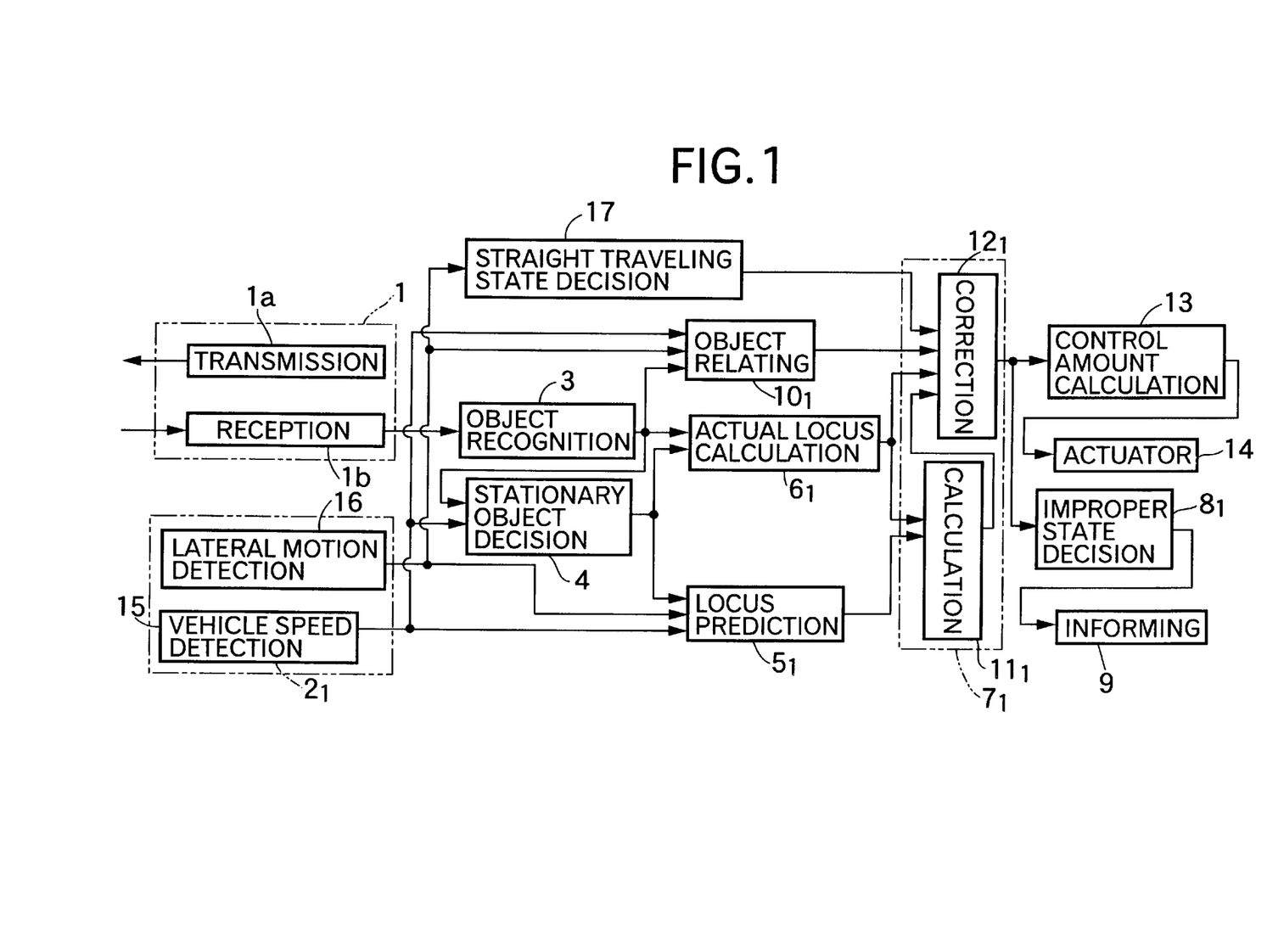
FIG. 1 is a block diagram showing the configuration of the object detecting system for a vehicle in a first embodiment of the present invention.

First, referring to FIG. 1, installed in the front part of a vehicle (not shown) is a radar 1 that can detect objects in front of the vehicle, for example. The object detecting system for a vehicle that detects objects based on the result of the search operation of the radar 1 includes a motion state detection means $2_1$ that detects the state of the motion of the vehicle and an object recognition means 3 that, based on the result of the search operation of the radar 1, recognizes an object in front of the vehicle by relating it at least to its position relative to the vehicle. A stationary object decision means 4 decides whether or not the object recognized by the object recognition means 3 is a stationary object based on the result of detection by the motion state detection means $2_1$, and a locus prediction means $5_1$ predicts a moving locus of the object, determined to be a stationary object by the stationary object decision means 4, as observed from the vehicle, based on the result of detection by the motion state detection means $2_1$. An actual locus calculation means $6_1$ calculates the actual moving locus of the object, determined to be a stationary object by the stationary object decision means 4, as observed from the vehicle, based on the change over time of the relative position of the object as detected by the object recognition means 3; and a comparison means $7_1$ compares the estimated value produced by the locus prediction means $5_1$ and the calculated value produced by the actual locus calculation means $6_1$. An improper state decision means $8_1$ decides whether the radar 1 is in an improper state based on the comparison result produced by the comparison means $7_1$; an informing means 9 performs an informing operation by voice or display, in accordance with the result of the decision made by the improper state decision means $8_1$. An object relating means $10_1$ which relates the path object, for which the motion of the vehicle must be controlled automatically or manually, to at least one of the objects relative position and relative speed with respect to the vehicle, in accordance with the result of the recognition by the object recognition means 3 and the result of detection by the motion state detection means $2_1$.

The comparison means $7_1$ includes a calculation section $11_1$ for calculating a difference between the estimated value determined by the locus prediction means $5_1$ and the calculated value determined by the actual locus calculation means $6_1$, and a correction section $12_1$ for correcting, based on the result of the calculation by the calculation section $11_1$, at least the relative position or relative speed of the object related by the object relating means $10_1$. The amount of vehicle control based on the path object corrected by the correction section $12_1$, is calculated by a control amount calculation means 13, and an actuator 14 for the automatic brake, alarm, and the like is activated in accordance with the result of the calculation by the control amount calculation means 13.

The radar 1 has an electromagnetic wave transmission means 1a that emits laser or millimeter waves as electromagnetic waves forwards in the direction in which the vehicle is traveling, and a reflected wave reception means 1b that receives a reflected wave which is produced when the laser or millimeter wave emitted from the electromagnetic wave transmission means 1a is reflected by an object present in the traveling direction of the vehicle. The motion state detection means $2_1$ includes a vehicle speed detection section 15 for detecting the speed of the vehicle and a lateral motion detection section 16 for detecting a yaw rate or lateral acceleration of the vehicle.

The stationary object decision means 4 determines that the object perceived by the object recognition means 3 in terms of the object's position relative to the vehicle, is stationary when the difference between the speed of the object relative to the vehicle and the vehicle speed detected by the vehicle speed detection section 15 of the motion state detection means $2_1$ is less than a small value of about 3 km/h.

The locus prediction means $5_1$ estimates the transfer locus of the object, determined to be a stationary object by the stationary object decision means 4, relative to the vehicle in accordance with the vehicle speed detected by the vehicle speed detection section 15 of the motion state detection means $2_1$ and the yaw rate or lateral acceleration of the vehicle detected by the lateral motion detection section 16.

Figure 2:
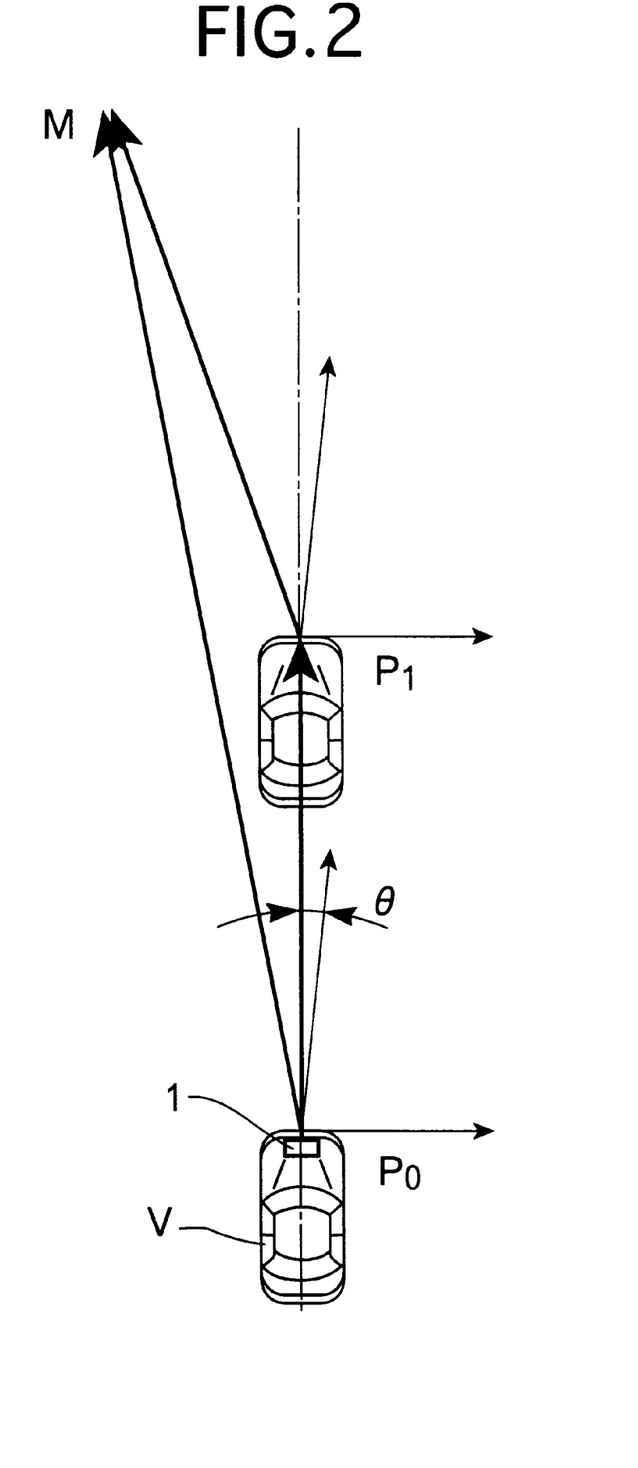
FIG. 2 is a schematic view showing the positional relationship between the vehicle and the stationary object with the road surface taken as a coordinate system.

In the case when the vehicle V is at position $P_0$ on the road surface, which is taken as a coordinate system, an object first recognized by the object recognition means 3 to be present at position M to the front left of the vehicle V as shown in FIG. 2 in accordance with the search operation result of the radar 1, is determined to be stationary, and the object at position M is still perceived by the object recognition means 3 after the vehicle V has moved to position $P_1$.

Figure 3:
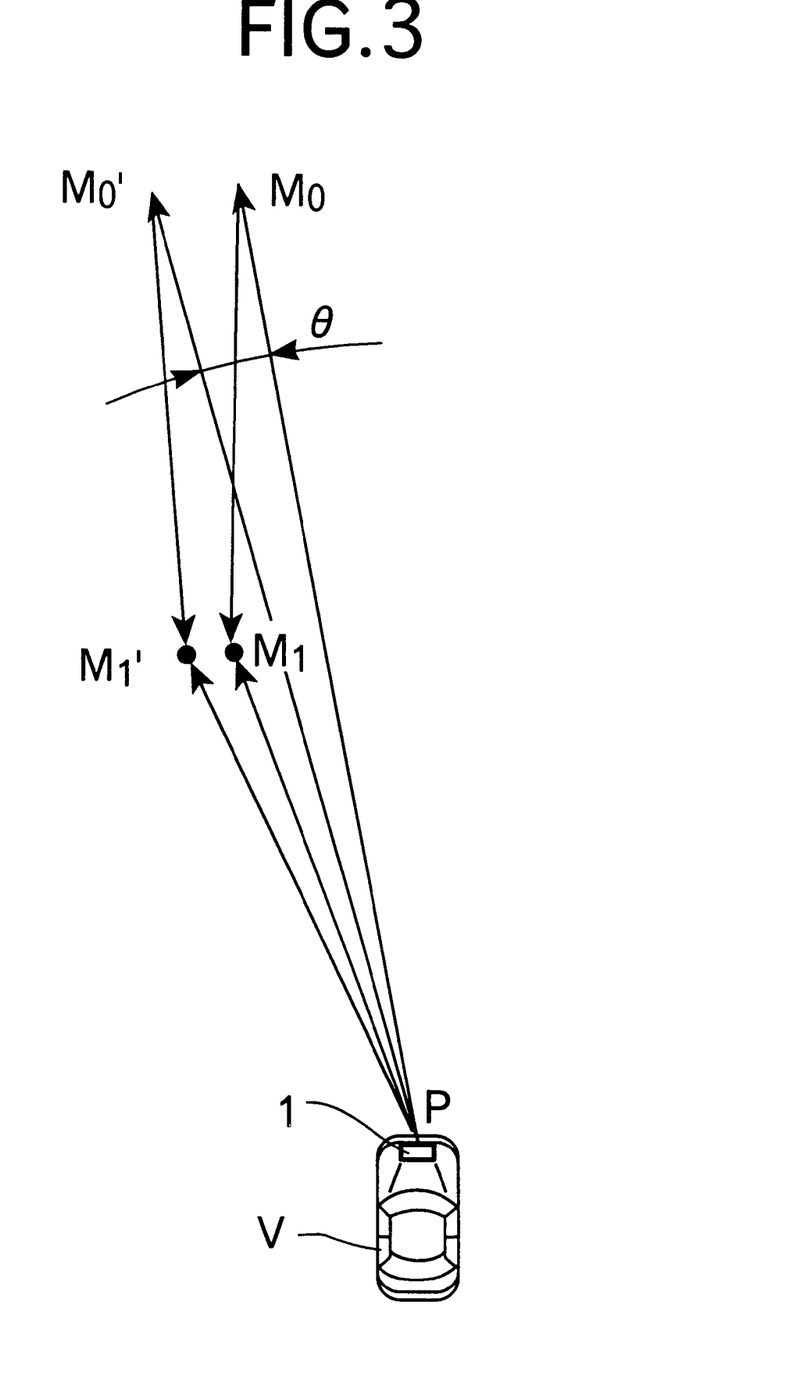
FIG. 3 is a schematic diagram showing the position of the stationary object relative to the vehicle in the vehicle coordinate system.

In a vehicle coordinate system that represents the object relative to the vehicle V with the position of the radar 1 mounted on the vehicle V taken as the origin of the system, the above-described case is as shown in FIG. 3. The transfer vector ($M_0$ K $M_1$) of the object as observed from the vehicle V has the following relationship when the vehicle V is traveling straight in a fixed direction.

Transfer vector (P K $M_0$)=Transfer vector ($P_0$ K M)

Transfer vector (P K $M_1$)=Transfer vector ($P_1$ K M)

Transfer vector ($M_0$ K $M_1$)
=Transfer vector (P K $M_1$)−Transfer vector (P K $M_0$)
=Transfer vector ($P_1$ K M)−Transfer vector ($P_0$ K M)
=−Transfer vector ($P_0$ K P1)

Thus, the transfer vector ($M_0$K $M_1$) of the object as observed from the vehicle V, can be estimated by the locus prediction means $5_1$ integrating the vehicle speed vector and calculating the transfer vector ($P_0$ K $P_1$) in accordance with the vehicle speed and the yaw rate or lateral acceleration detected by the motion state detection means $2_1$.

In the case in which the direction of radar emission from the radar 1 is deviated to the right by an angle θ, the position of the object relative to the vehicle V, is deviated to the left by an angle θ in FIG. 3 and the transfer vector ($M_0'$ K $M_1'$) in this state is also displaced in angle by θ. The transfer vector ($M_0'$ K $M_1'$) in a plane substantially parallel to the travel road surface, is calculated by the actual locus calculation means $6_1$ in accordance with the change over time of the relative position of the object detected by the object recognition means 3, that recognizes the object based on the result of the search operation of the radar 1. Then, the calculation section $11_1$ of the comparison means $7_1$ calculates the difference between the transfer vector ($M_0$ K $M_1$) estimated by the locus prediction means $5_1$ and the transfer ($M_0'$ K $M_1'$) calculated by the actual locus calculation means $6_1$ to determine the amount of deviation θ in the direction of laser emission in a plane substantially parallel to the travel road surface.

Although the above description assumes that the vehicle V is traveling straight in a fixed direction for the purpose of simplicity, a similar calculation can also be performed when the vehicle V is moving in a curved path, by taking the turning of the vehicle into account. That is, the velocity vector of the vehicle is determined from the vehicle speed and the yaw rate or lateral acceleration to calculate the transfer vector ($P_0$ K $P_1$), and the transfer vector (P K $M_1$) is shifted by an angle corresponding to the directional change that the vehicle undergoes as it moves from position $P_0$ to position $P_1$ to determine the transfer vector ($M_0$ K $M_1$).

In this way, the calculation section $11_1$ of the comparison means $7_1$ outputs a signal corresponding to the directional deviation of the emission from the radar 1 in a plane substantially parallel to the road surface, on which the vehicle is traveling. The improper state decision means $8_1$ outputs a signal representing an improper state, when the output signal from the comparison means $7_1$, which is the calculated value of the calculation section $11_1$ corrected by the correction section $12_1$, is greater than a first threshold value. The informing means 9 is activated in accordance with the decision made by the improper state decision means $8_1$. The first threshold value is set at such a value that the directional deviation of the laser emission from the radar 1, even if corrected by the correction section $12_1$, is considered to result in an insufficient field of view on either the left or the right side and, therefore, an insufficient control performance. When that threshold is exceeded, the informing means 9 is operated to urge the driver to make repairs.

At least one of the relative position and the relative speed of the path object with respect to the vehicle determined by the object relating means $10_1$, is corrected by the correction section $12_1$. The correction section $12_1$ has a function of filtering the result of the calculation made by the calculation section $11_1$ in accordance with the equation shown below, to make corrections based on the current calculation result as well as the past calculation results produced by the calculation section $11_1$.

$$\phi_n = (1-a)\cdot\phi_{n-1} + a\cdot\theta_n$$

where $\phi_n$ is a directional deviation (in angle) of laser emission from the radar 1 after the nth filtering process, $\phi_{n-1}$ is a directional deviation (in angle) of emission from the radar 1 after the (n−1)th filtering process, $\theta_n$ is a directional deviation (in angle) of nth laser emission from the radar 1 obtained as a result of the calculation by the calculation section $11_1$, and a is a weighting coefficient.

Thus, the correction section $12_1$ corrects at least the relative position or the relative speed of the path object with respect to the vehicle as determined by the object relating means $10_1$ by using the directional deviation (in angle) of emission $\phi_n$ obtained from the filtering process. The more straight the vehicle is travelling and the greater the calculated locus produced by the actual locus calculation means $6_1$, the larger the weighting coefficient a will be set. Hence, the correction section $12_1$ is supplied with the decision of a straight traveling state decision means 17 which decides whether or not the vehicle is traveling straight and the calculation result of the actual locus calculation means $6_1$. The straight traveling state decision means 17 determines whether or not the vehicle is moving straight in accordance with the quantity detected by the lateral motion detection section 16 of the motion state detection means $2_1$.

When a plurality of objects detected by the radar 1 are determined to be stationary by the stationary object decision means 4, the correction section $12_1$ performs the following calculations, based on the calculated values $\theta_{1n}$, $\theta_{2n}$ ... obtained by the calculation section $11_1$, for each of stationary object 1 and stationary object 2 to determine the deviations $\phi_{1n}$, $\phi_{2n}$ ... of the stationary objects 1, 2 ...

$$\phi_{1n} = (1-a_1)\cdot\phi_{1n-1} + a_1\cdot\theta_{1n}$$

$$\phi_{2n} = (1-a_2)\cdot\phi_{2n-1} + a_2\cdot\theta_{2n}$$

...

The weighted average of these deviations $\phi_{1n}$, $\phi_{2n}$ ... is obtained in accordance with the equation shown below.

$$\phi_n = p\cdot\phi_{1n} + q\cdot\phi_{2n} + ...$$

In these equations, $a_1$, $a_2$ ... are set larger as the vehicle moves more straight, and as the locus calculated by the actual locus calculation means $6_1$ becomes larger. P, q ... are coefficients that satisfy the condition of (p+q+. . . =1) and they are set to increase as the lateral deviation becomes small. That is, when a plurality of stationary objects are being detected simultaneously, the correction section $12_1$ corrects the deviation for each of the stationary object 1, object 2 ... by assuming that the object with a smaller lateral deviation relative to the vehicle advancing direction, provides a better accuracy of the directional deviation of laser emission.

It is also possible to make corrections of the deviations by the correction section $12_1$ based only on one of the plurality of simultaneously detected stationary objects that has the least lateral deviation. Further, the correction of the deviations may be performed by the correction section $12_1$ based only on the stationary object with the largest actual locus calculated value produced by the actual locus calculation means $6_1$.

Next, the operation of the first embodiment will be explained. An estimated value of the moving locus of the object, which is determined to be stationary by the stationary object decision means 4, as seen by the vehicle is predicted by the locus prediction means $5_1$ based on the result of detection by the motion state detection means $2_1$. An observed value of the moving locus of the stationary object relative to the vehicle, is calculated by the actual locus calculation means $6_1$ based on the change over time of the relative position of the object detected by the object recognition means 3, which perceives an object in terms of the object's position relative to the vehicle, by using the result of the search operation of the radar 1. The estimated moving locus and the observed moving locus are compared by the comparison means $7_1$ and, based on the result of this comparison, the directional deviation of laser emission from the radar 1 can be detected. The comparison result is also used by the improper state decision means $8_1$ in making a decision on the improper state of the radar 1. Stationary objects such as guardrails, traffic light poles and utility poles are frequently observed during ordinary cruising of the vehicle and thus the improper state of the radar 1 in which the radar is directionally deviated can easily be detected while the vehicle is traveling in ordinary traveling conditions, not limited to specified traveling conditions.

When the result of the decision made by the improper state decision means $8_1$ being greater than the first threshold value, the improper state decision means $8_1$ decides that the directional deviation of the laser emission from the radar 1 is too large to provide the desired control performance even if corrections are made by the correction section $12_1$ of the comparison means $7_1$. As a result, the improper state decision means $8_1$ activates the informing means 9, to urge the driver to repair the radar 1.

The locus prediction means $5_1$ estimates the moving locus of the stationary object relative to the vehicle, based on the vehicle speed and the yaw rate or lateral acceleration detected by the motion state detection means $2_1$. The actual locus calculation means $6_1$ calculates the observed moving locus of the stationary object, relative to the vehicle in a plane substantially parallel to the road surface on which the vehicle is traveling. The comparison means $7_1$ outputs a signal corresponding to the directional deviation of laser emission from the radar 1 in a plane substantially parallel to the travel road surface, making it possible to easily determine that the deviation of the radar search direction from a proper direction in a plane virtually parallel to the travel road surface becomes large.

At least one of the relative position and the relative speed of the path object with respect to the vehicle, as determined by the object relating means $10_1$, is corrected by the correction section $12_1$ based on the calculated result from the calculation section $11_1$ of the comparison means $7_1$. Because at least the relative position or the relative speed of the path object, for which the vehicle motion must be controlled, is corrected in accordance with the deviation of the search direction of the radar 1 from the proper direction in a plane virtually parallel to the travel road surface, the motion of the vehicle can be controlled more precisely.

When two or more of the objects detected by the radar 1 are determined as stationary objects by the stationary object decision means 4, the correction section $12_1$ allots a larger degree of correction to an object with a smaller lateral deviation from the direction in which the vehicle is moving. In other words, during the correction process, a larger degree of correction is given to the situation where the detection error of the motion state detection means $2_1$ is relatively small, i.e., when the vehicle's lateral motion is small and the object is close to the front of the vehicle. With this correction process, the deviation of the search direction of the radar 1 in a plane virtually parallel to the road surface, can be corrected with high precision.

In the correction process, the correction section $12_1$ makes a larger degree of correction when the straight traveling state decision means 17 decides that the vehicle is moving straight than when the vehicle is not moving straight. When the vehicle is traveling straight, the detection error of the motion state detection means $2_1$ is relatively small, allowing the precise correction of the deviation of the search direction of the radar 1 in a plane substantially parallel to the road surface.

Further, the correction section $12_1$ makes a larger degree of correction as the amount of locus calculated by the actual locus calculation means $6_1$ increases. Taking advantage of the fact that a greater amount of locus results in a better precision of the locus amount calculation regardless of the accuracy of the object recognition means 3 in locating the position, relative to the vehicle, of the object present in the traveling direction of the vehicle, the correction section $12_1$ can make precise correction on the deviation of the search direction of the radar 1.

Figure 4:
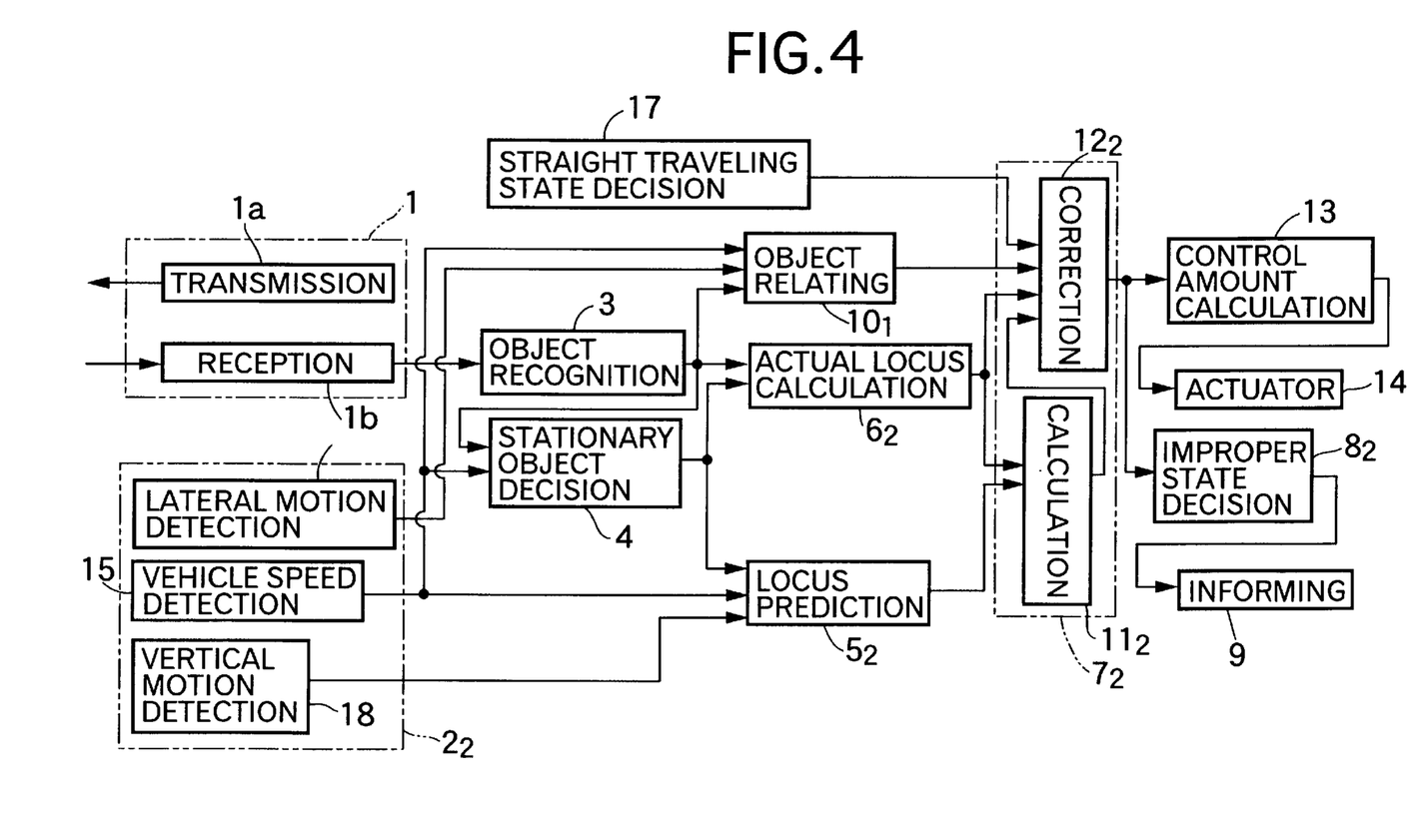
FIG. 4 is a block diagram showing the configuration of the object detecting system for a vehicle in a second embodiment of the present invention.

FIG. 4 shows a second embodiment of this invention, in which parts corresponding to those of the first embodiment are provided with like reference numerals.

The object detecting system for a vehicle includes a motion state detection means $2_2$ that detects the motion state of the vehicle; an object recognition means 3; a stationary object decision means 4; and a locus prediction means $5_2$ that, based on the result of detection by the motion state detection means $2_2$, estimates the moving locus of an object, determined to be stationary by the stationary object decision means 4, relative to the vehicle as observed from the vehicle. An actual locus calculation means $6_2$, based on the change over time of the relative position of the object detected by the object recognition means 3, calculates an actual moving locus of the stationary object as observed from the vehicle; and a comparison means $7_2$ that compares the predicted value produced by the locus prediction means $5_2$ and the calculated value produced by the actual locus calculation means $6_2$. An improper state decision means $8_2$ determines an improper state of the radar 1 in accordance with the result of the comparison performed by the comparison means $7_2$; and an informing means 9 performs an informing operation by voice or display in accordance with the result of the decision made by the improper state decision means $8_2$. An object relating means $10_2$ relates the path object to at least its relative distance or relative speed with respect to the vehicle in accordance with the result of the recognition by the object recognition means 3 and the result of detection by the motion state detection means $2_2$.

The comparison means $7_2$ includes a calculation section $11_2$ that calculates a difference between the predicted value produced by the locus prediction means $5_2$ and the calculated value produced by the actual locus calculation means $6_2$; and a correction section $12_2$ that corrects at least the relative position or relative speed of the object related by the object relating means $10_2$ in accordance with the result of the calculation by the calculation section $11_2$. The amount of control based on the path object corrected by the correction section $12_2$ is calculated by the control amount calculation means 13, and an actuator 14 is activated in accordance with the result of the calculation by the control amount calculation means 13.

The motion state detection means $2_2$ includes a vehicle speed detection section 15, a lateral motion detection section 16 for detecting the yaw rate or lateral acceleration of the vehicle, and a vertical motion detection section 18 for detecting the pitch rate or vertical acceleration of the vehicle.

The locus prediction means $5_2$ predicts the moving locus of the object, determined to be stationary by the stationary object decision means 4, as observed from the vehicle in accordance with the vehicle speed detected by the vehicle speed detection section 15 of the motion state detection means $2_2$ and the pitch rate or vertical acceleration detected by the vertical motion detection section 18.

The actual locus calculation means $6_2$ calculates, based on the change over time of the relative position of the object detected by the object recognition means 3, the moving locus of the object as observed from the vehicle in a plane substantially perpendicular to the road surface on which the vehicle is traveling, the object being determined to be stationary in a plane virtually perpendicular to the travel road surface.

The calculation section $11_2$ of the comparison means $7_2$ compares the estimated value produced by the locus prediction means $5_2$ and the calculated value produced by the actual locus calculation means $6_2$ to output a signal corresponding to the directional deviation of the radar 1 in a plane substantially perpendicular to the travel road surface. The improper state decision means $8_2$ outputs a signal representing an improper state when the output signal from the comparison means $7_2$ after the calculated value of the calculation section $11_2$ has been corrected by the correction section $12_2$, is larger than a second threshold value. In accordance with the decision made by the improper state decision means $8_2$ of the improper state, the informing means 9 is operated. The second threshold value is set at such a value that the directional deviation of the radar 1, even if corrected by the correction section $12_2$, is considered to result in an insufficient control performance.

At least one of the relative position and relative speed of the path object with respect to the vehicle determined by the object relating means $10_2$ is corrected by the correction section $12_2$. The correction section $12_2$ receives the results of the decisions made by an acceleration sensor and a road surface gradient decision means 19, both of which determine the variations of gradient of the road surface by detecting or calculating the longitudinal acceleration of the vehicle. The correction section $12_2$ also receives the result of the calculation by the actual locus calculation means $6_2$. The correction section $12_2$ sets a larger coefficient for correcting the deviation of the radar search direction when the road surface gradient decision means 19 decides that the gradient variation is infrequent than when the gradient variation is determined as frequent. The correction section $12_2$ increases the degree of the correction as the amount of calculated locus produced by the actual locus calculation means $6_2$ increases.

With the second embodiment, because the locus prediction means $5_2$ predicts, based on the vehicle speed and the pitch rate or vertical acceleration, the moving locus of the stationary object as observed from the vehicle in a plane substantially perpendicular to the road surface and because the actual locus calculation means $6_2$ calculates the moving locus of the stationary object as observed from the vehicle in a plane substantially perpendicular to the road surface, the comparison means $7_2$ can produce a signal corresponding to the directional deviation of the radar 1 in a plane virtually parallel to the travel road surface. This makes it possible to easily determine that the deviation of radar search direction from a proper direction in a plane virtually perpendicular to the travel road surface, becomes large.

At least one of the relative position and the relative speed of the path object with respect to the vehicle, as determined by the object relating means $10_2$, is corrected by the correction section $12_2$ based on the calculated result from the calculation section $11_2$ of the comparison means $7_2$. Because at least the relative position or the relative speed of the path object, for which the vehicle motion must be controlled, is corrected in accordance with the deviation of the search direction of the radar 1 from the proper direction in a plane virtually perpendicular to the travel road surface, the motion of the vehicle can be controlled more precisely.

The correction section $12_2$ sets a larger coefficient for correcting the deviation of the radar search direction when the road surface gradient decision means 19 decides that the gradient variation of the road is infrequent, than when the gradient variation is decided as being frequent. When the vehicle is traveling on a constant gradient road surface, the detection error made by the motion state detection means $2_2$ is relatively small, allowing the precise correction of the directional deviation of the search direction of the radar 1 in a plane substantially perpendicular to the travel road surface.

Further, the correction section $12_2$ increases the degree of correction as the amount of locus calculated by the actual locus calculation means $6_2$ increases. Taking advantage of the fact that a greater amount of locus results in a better precision of the locus amount calculation regardless of the accuracy of the object recognition means 3 in locating the position, relative to the vehicle, of the object present in the traveling direction of the vehicle, it is possible to make precise correction on the deviation of the search direction of the radar 1.

While the first embodiment detects the directional deviation of the radar 1 in a plane substantially parallel to the travel road surface and the second embodiment detects the directional deviation of the radar 1 in a plane virtually perpendicular to the travel road surface, it is possible to detect the directional deviations of the radar 1 in both planes substantially parallel and perpendicular to the travel road surface and to make corrections in accordance with the detected deviations. Further, frequency of the gradient variation of the travel road surface may be determined by using the result of detection by the vertical motion detection section 18, rather than using the acceleration sensor and the road surface gradient decision means 19, both of which determine the frequency of the variation of gradient of the travel road surface by detecting or calculating the longitudinal acceleration of the vehicle.

Further, this invention can be applied to an object detecting system for a vehicle that has a radar to detect objects behind the vehicle.

According to the invention, it is possible, while the vehicle is traveling in ordinary traveling conditions, not limited to specified traveling conditions, to detect that the radar is in an inappropriate state in which the radar irradiation direction is deviated.

According to the invention, the moving locus of an object in a plane substantially parallel to the travel road surface can be estimated by a locus prediction means of a simple configuration.

Further, according to the invention, it is possible to easily decide that the deviation of the radar search direction from an appropriate direction in a plane substantially parallel to the travel road surface becomes large.

Also at least one of the relative position and the relative speed of the path object, for which the vehicle motion must be controlled, can be corrected in accordance with the deviation of the radar search direction from the proper direction in a plane virtually parallel to the travel road surface, thereby allowing accurate control of the vehicle motion.

According to the invention, the deviation of the radar search direction in a plane substantially parallel to the travel road surface can be corrected with precision.

Further, the moving locus of the object in a plane substantially perpendicular to the travel road surface can be estimated by a locus prediction means of a simple configuration.

Also, it is possible to easily decide that the deviation of the radar search direction from a proper direction in a plane virtually perpendicular to the travel road surface becomes large.

According to the invention, at least one of the relative position and the relative speed of the path object, for which the vehicle motion must be controlled, can be corrected in accordance with the deviation of the radar search direction from a proper direction in a plane virtually perpendicular to the travel road surface, thereby allowing the precise control of the vehicle motion.

Further, by taking advantage of the fact that the detection error of the motion state detection means is smaller when the gradient variation of the travel road surface is infrequent than when the gradient variation is frequent, it is possible to increase the degree of correction and thereby correct with higher precision, the deviation of the radar search direction in a plane virtually perpendicular to the travel road surface.

Still further, by taking advantage of the fact that a greater locus amount results in a higher precision of the locus amount calculation regardless of the accuracy of the object recognition means in locating the relative position, with respect to the vehicle, of the object present in the traveling direction of the vehicle, it is possible to correct the deviation of the radar search direction more accurately.

Further according to the invention, when the radar is in an improper state, the informing means is activated to urge the driver to repair the radar.

The embodiments of the present invention have been described in detail. It is noted that this invention is not limited to the above embodiments but that various design modifications can be made without departing from the spirit of the invention as defined in the claims.

I claim:

1. An object detecting system of a vehicle, comprising:

a radar for performing a search operation, the radar including an electromagnetic wave transmission means for transmitting an electromagnetic wave in a traveling direction of the vehicle and a reflected wave reception means for receiving a reflected wave produced when the electromagnetic wave transmitted from the electromagnetic wave transmission means is reflected by an object present in the traveling direction of the vehicle, whereby the object detection system detects the object based on the result of the radar search operation, the object detecting system comprising;

a motion state detection means for detecting a motion state of the vehicle including a vehicle speed;

an object recognition means for recognizing the object present in the traveling direction of the vehicle in terms of at least a position thereof relative to the vehicle in accordance with the result of the radar search operation;

a stationary object decision means for determining, based on the result of detection by the motion state detection means, whether or not the object recognized by the object recognition means is a stationary object;

a locus prediction means for estimating a moving locus of the object relative to the vehicle, in accordance with the result of detection by the motion state detection means, the object being determined as a stationary object by the stationary object decision means;

an actual locus calculation means for calculating an actual moving locus of the object relative to the vehicle in accordance with a change over time of the relative position of the object recognized by the object recognition means, the object being determined as a stationary object by the stationary object decision means;

a comparison means for comparing the estimated value determined by the locus prediction means and the calculated value determined by the actual locus calculation means; and an improper state decision means for determining an improper state of the radar based on the result of the comparison determined by the comparison means.

2. An object detecting system for a vehicle according to claim 1, wherein the motion state detection means includes a vehicle speed detection section to detect the speed of the vehicle and a lateral motion detection section to detect a yaw rate or lateral acceleration of the vehicle, and wherein the locus prediction means estimates the moving locus of the object relative to the vehicle, based on the vehicle speed detected by the vehicle speed detection section and on the yaw rate or lateral acceleration detected by the lateral motion detection section.

3. An object detecting system for a vehicle according to claim 2, wherein the actual locus calculation means calculates the moving locus of the object relative to the vehicle in a plane substantially parallel to a road surface on which the vehicle is traveling, the object being determined as a stationary object, and wherein the improper state decision means outputs a signal representing the improper state when a signal output from the comparison means in accordance with the result of the comparison between the calculated result from the actual locus calculation means and the estimated result from the locus prediction means, is greater than a first threshold value, the signal output from the comparison means corresponding to a deviation in said plane substantially parallel to the travel road surface.

4. An object detecting system for a vehicle according to any one of claims 1 to 3, further including an object relating means which relates a path object, for which the vehicle motion must be controlled, to at least one of a relative position and a relative speed of the object with respect to the vehicle in accordance with the result of the recognition by the object recognition means and the result of detection by the motion state detection means; wherein the comparison means comprises a calculation section to calculate a difference between the estimated value determined by the locus prediction means and the calculated value determined by the actual locus calculation means and a correction section to correct, based on the calculation by the calculation section, at least one of the relative position and the relative speed to which the object relating means relates the path object.

5. An object detecting system for a vehicle according to claim 4, wherein the correction section performs correction in accordance with a current calculation result and a past calculation result determined by the calculation section.

6. An object detecting system for a vehicle according to claim 4, wherein, when the stationary object decision means determines that two or more of the objects detected simultaneously by the radar are stationary, the correction section increases the degree of the correction that is based on the object having a small lateral deviation with respect to the traveling direction of the vehicle.

7. An object detecting system for a vehicle according to claim 4, further including a straight traveling state decision means for determining, based on the result of detection by the motion state detection means, whether the vehicle is traveling straight; wherein the correction section makes a larger degree of correction when the straight traveling state decision means determines that the vehicle is traveling straight than when the vehicle is not traveling straight.

8. An object detecting system for a vehicle according to claim 4, wherein the correction section increases the degree of correction as the calculated locus amount determined by the actual locus calculation means increases.

9. An object detecting system for a vehicle according to claim 1, wherein the motion state detection means includes a vehicle speed detection section for detecting the speed of the vehicle and a vertical motion detection section for detecting a pitch rate or vertical acceleration of the vehicle, and the locus prediction means estimates the moving locus of the object relative to the vehicle in accordance with the vehicle speed detected by the vehicle speed detection section and the pitch rate or vertical acceleration detected by the vertical motion detection section, the object being determined as a stationary object.

10. An object detecting system for a vehicle according to claim 9, wherein the actual locus calculation means calculates the moving locus of the object relative to the vehicle in a plane substantially perpendicular to the road surface on which the vehicle is traveling, the object being determined as a stationary object, and the improper state decision means outputs a signal representing the improper state when a signal, output from the comparison means in accordance with the result of the comparison between the calculated result from the actual locus calculation means and the estimated result from the locus prediction means, is greater than a second threshold value, the signal output from the comparison means corresponding to a deviation in a plane substantially perpendicular to the travel road surface.

11. An object detecting system for a vehicle according to claim 9 or 10, further including an object relating means which relates a path object, for which the vehicle motion must be controlled, to at least one of a relative position and a relative speed of the object with respect to the vehicle in accordance with the result of recognition by the object recognition means and the result of detection by the motion state detection means; wherein the comparison means comprises a calculation section for calculating a difference between the estimated value determined by the locus prediction means and the calculated value determined by the actual locus calculation means, and a correction section for correcting, based on the result of the calculation by the calculation section, at least one of the relative position and the relative speed to which the object relating means relates the path object.

12. An object detecting system for a vehicle according to claim 11, further including a road surface gradient decision means for determining a gradient variation of the road surface on which the vehicle is traveling; wherein the correction section sets a larger coefficient for correcting the deviation of the radar search direction when the road surface gradient decision means determines that a gradient variation is infrequent.

13. An object detecting system for a vehicle according to claim 11, wherein the correction section increases the degree of correction as the calculated locus amount determined by the actual locus calculation means increases.

14. An object detecting system for a vehicle according to any one of claims 1, 2, 3, 9, or 10, further including an informing means for informing that the determination by improper state decision means indicates an improper state of the radar.

* * * * *